United States Patent
West

[15] 3,650,550
[45] Mar. 21, 1972

[54] LINED CONDUIT
[72] Inventor: Walter H. West, Bay City, Mich.
[73] Assignee: The Dow Chemical Company, Midland, Mich.
[22] Filed: Aug. 13, 1970
[21] Appl. No.: 63,548

[52] U.S. Cl. ..............................285/55, 138/109, 285/363, 285/423
[51] Int. Cl. ..........................................F16l 13/00
[58] Field of Search ...............29/157; 138/109, 174; 285/55, 285/229, 423, DIG. 10, DIG. 20, 363, 7, 8; 18/19

[56] References Cited

UNITED STATES PATENTS

| | | | |
|---|---|---|---|
| 1,939,872 | 12/1933 | Bedur | 138/109 X |
| 3,039,795 | 6/1962 | Reuter | 285/423 X |
| 3,139,115 | 6/1964 | Bowcom et al. | 285/229 X |
| 3,383,750 | 5/1968 | Schroeder et al. | 29/157 R |

FOREIGN PATENTS OR APPLICATIONS

| | | | |
|---|---|---|---|
| 678,241 | 1/1964 | Canada | 285/174 |
| 1,268,406 | 6/1961 | France | 285/55 |

*Primary Examiner*—Dave W. Arola
*Attorney*—Griswold & Burdick, Richard G. Waterman and Robert B. Ingraham

[57] ABSTRACT

In lined conduit having flanged connections, improved joints are obtained when a multiple recessed rigid support is employed underneath the molded raised face of the flange of the plastic liner. Substantially improved joints are obtained under conditions wherein the plastic lining is subject to cold flow.

7 Claims, 8 Drawing Figures

Patented March 21, 1972 3,650,550

INVENTOR.
Walter H. West
BY Robert B. Ingraham
AGENT

Patented March 21, 1972

3,650,550

INVENTOR.
Walter H. West
BY
Robert Bingraham
AGENT

LINED CONDUIT

Corrosion of piping has been a substantial problem for many years. In order to overcome the problem of corrosion a wide variety of corrosion-resistant alloys have been employed, as well as lining of pipes such as steel pipe with rubber, plastics, glass and the like. Plastics; that is, synthetic resinous or synthetic elastomeric materials such as rubber, have found wide application in areas where corrosion resistance is required. Most plastic materials are readily fabricated by such techniques as extrusion, compression molding and the like. Other plastic materials such as polytetrafluoroethylene are fabricated by somewhat similar techniques but with greater difficulty. Many plastic materials which are heat formable are also subject to cold flow or creep; that is, a specimen of plastic material under either compressive or tensile load over a period of days or months will exhibit permanent deformation at a temperature below its softening temperature. Oftentimes lined pipe is prepared by lining a suitable casing such as a steel pipe with a tube of a suitable heat formable synthetic material and appropriate flanges provided on either end of the pipe or fitting and the liner subsequently flanged to provide a liner flange usually of smaller diameter than the casing flange and adapted to mate with a like flange on a fitting or pipe section. Oftentimes under service conditions such lined pipe may be subject to temperature cycling wherein temperatures approach the softening temperature of the lining, and what was originally installed as a tight leak-proof joint becomes leaky due to the slow deformation of the liner material in the flange region.

It would be advantageous if there were available an improved lined pipe joint.

It would also be desirable if such an improved lined pipe joint showed substantial increase in service life.

It would further be desirable to provide an improved conduit section or conduit end having a plastic lining and flange which exhibited reduced tendency to cold flow.

These benefits and other advantages in accordance with the present invention are achieved in a conduit, the conduit comprising a rigid outer casing having at least a first end, the first end having a flange disposed thereon adapted to connect with a mating flange, the conduit having a synthetic polymeric lining, the lining being subject to cold flow, the lining having a flange adjacent the first end of the conduit, the lining flange extending generally parallel to the conduit flange and supported by said conduit flange, the improvement which comprises a multiple recessed rigid support disposed generally between the liner flange and the conduit flange, the support defining a plurality of recesses, the recesses containing material of the liner flange and being in contact therewith.

Also contemplated within the scope of the present invention is a method for the preparation of a joint between a first and second conduit, the first and second conduits comprising a rigid outer member and a synthetic polymeric inner member generally concentrically arranged, the first and second members each having mating flanges and a portion of the liner extending from each of the conduits, applying an annular support member over the extending portion of the liner, molding the extending portions of the liners to form flanges, the flanges being generally parallel and coextensive with at least a portion of the flanges of the conduit, with the further limitation that during molding, material of the liner is forced into recesses defined by the support, subsequently placing first and second conduits in generally abutting mating relationship wherein the synthetic polymeric flange portions of the lining are in contact, and affixing said flanges to one another.

Further features and advantages of the present invention will become more apparent from the following specification taken in connection with the drawing wherein:

FIG. 1 schematically depicts a pipe joint in accordance with the invention.

Figure 1:
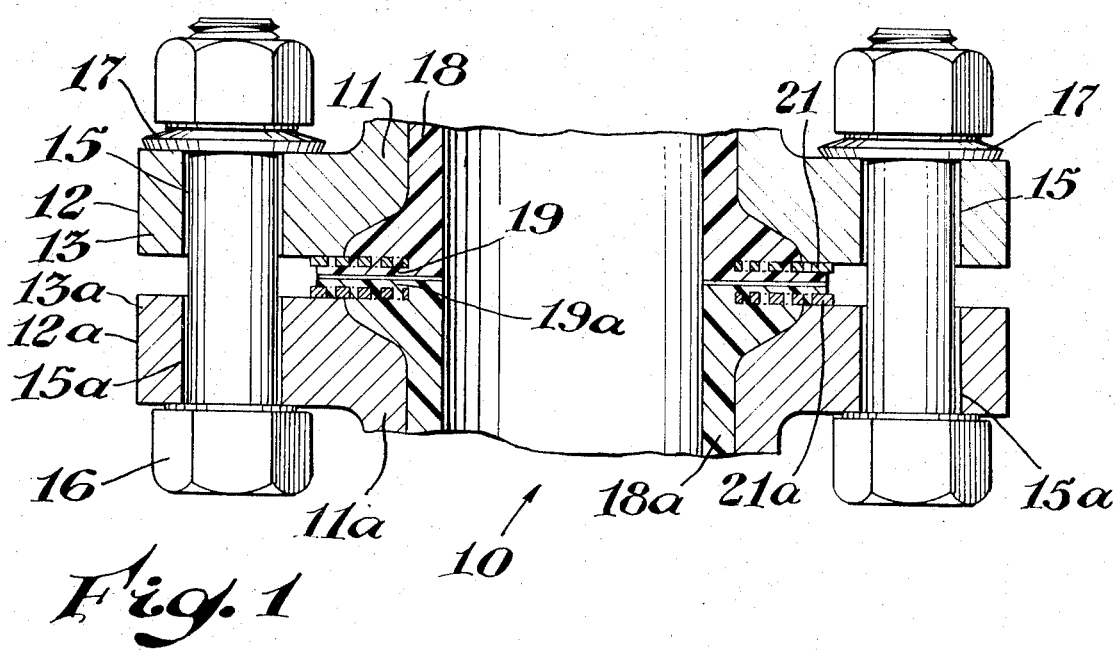

In FIG. 1 there is depicted a sectional view of a joint in accordance with the present invention generally designated by the reference numeral 10. The joint 10 comprises first and second identical conduit or pipe portions 11 and 11a, the pipe portions 11 and 11a each having terminal ends 12 and 12a, respectively. The ends 12 and 12a have terminal flanges 13 and 13a, each of the flanges 13 and 13a defining bolt passages 15 and 15a, respectively. Disposed within the passages 15 and 15a are bolts 16 with associated nuts and cone spring washers 17, frequently referred to as Bellville washers. The pipe portions 11 and 11a have internal thermoplastic linings 18 and 18a each terminating in flanges 19 and 19a. The flanges 19 and 19a are disposed generally parallel to the opposed faces of the flanges 13 and 13a. Disposed between the flanges 19 and 19a and the flanges 13 and 13a are multiple recessed support members 21 and 21a, respectively.

Figure 2:
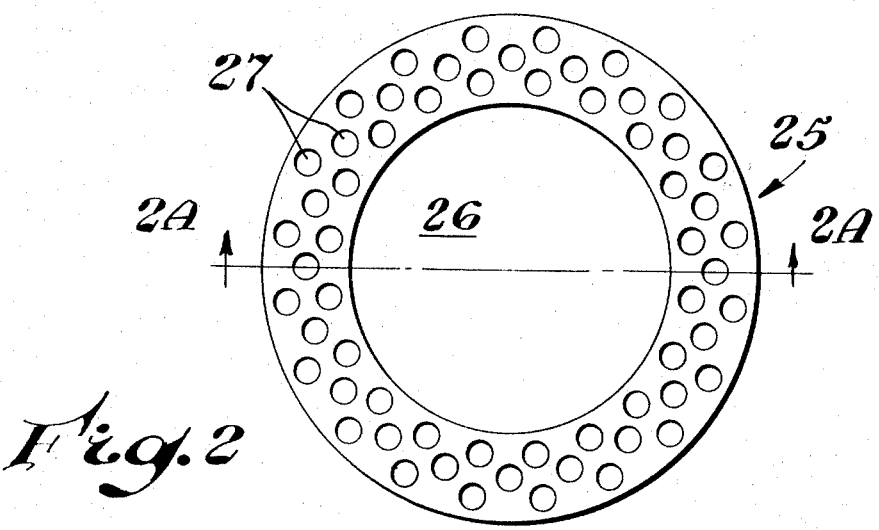
FIGS. 2 and 2A depict a plan and sectional view of a multiple recessed support means suitable for practice of the invention.
Figure 2A:
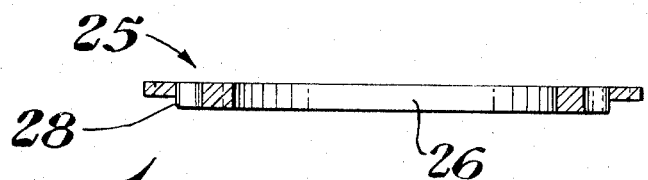

FIGS. 2 and 2A show a plan and cross-sectional view, respectively, of a multiple recessed support member 25 which corresponds to the support members 21 and 21a of FIG. 1. The support member 25 is of generally annular configuration and defines a centrally disposed opening 26 having a larger diameter than the inside diameter of the liner with which it is to be employed. The annular body 25 defines a plurality of recesses or perforations 27 which, during molding, permit entry of the heat plastified liner material.

FIG. 2A depicts an outwardly facing shoulder 28. The shoulder 28 conveniently engages a portion of a flange against which a portion of the flange 25 is positioned and maintains the annular support generally concentrically with the pipe.

Figure 3:
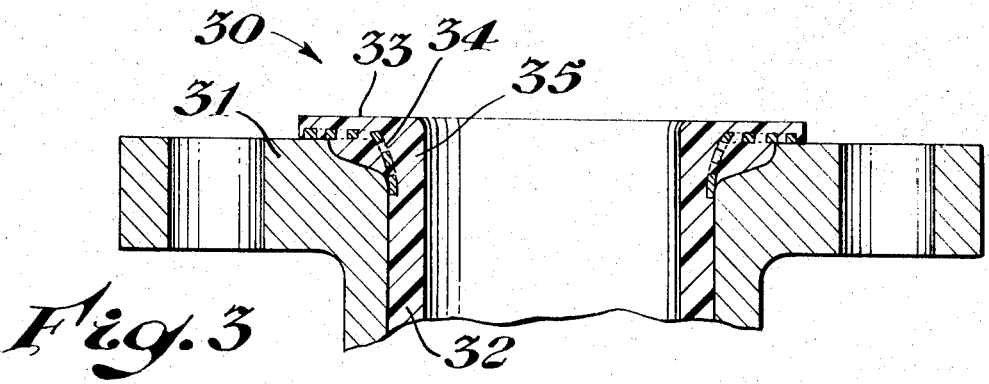
FIGS. 3 and 4 depict an alternate embodiment of a support means disposed in a lined flanged conduit.

FIG. 3 is a sectional view of a conduit end generally designated by the reference numeral 30. The conduit end 30 has a flange 31, a synthetic resinous liner 32, the liner 32 having a flange 33 and a perforate or multiple recessed support member 34. The annular support 34 has formed thereon a generally axially depending flange 35 of sufficient length to engage the terminal portion of the pipe and maintain the flange in the centered position during molding of the flange 33 and liner such as by the procedure set forth in U.S. Pat. No. 3,093,864.

Figure 4:
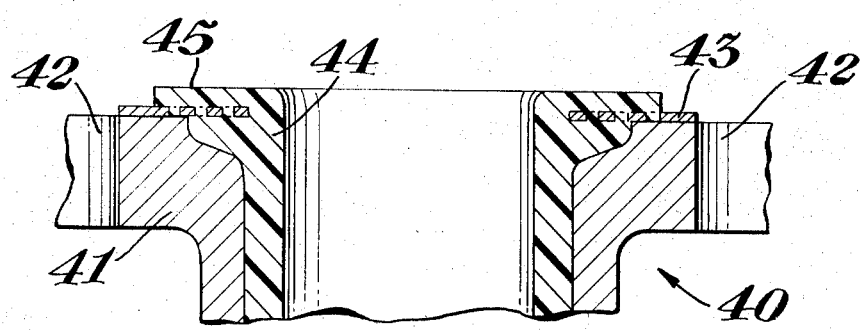

In FIG. 4 there is depicted an alternate embodiment of the invention employing a conduit 40. The conduit 40 has a terminal portion 41 and bolt holes 42. An annular multiple recessed or perforate support member 43 is disposed on the face of the flange 41. The conduit 40 has a thermoplastic liner 44 overlying the support 43. The support 43 has a diameter sufficient that it approximates the radial distance from the innermost portion of the bolt holes 42 to the center of the conduit, thus permitting bolts positioned in the holes 42 during flange molding operation to center the support member 43.

Figure 5:
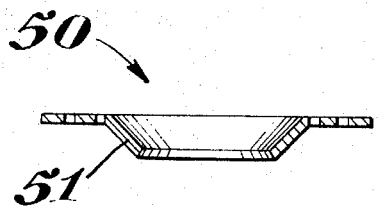
FIGS. 5, 6 and 7 depict alternate embodiments of support means suitable for practice of the present invention.

FIG. 5 depicts an alternate support member 50 having a generally annular configuration and an inwardly disposed generally axially depending flange 51 adapted to engage the terminal portion of the pipe and cause the support member to be centered during the molding operation.

Figure 6:
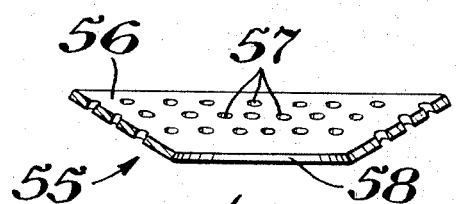

FIG. 6 is a sectional view of an alternate support member in accordance with the invention generally designated by the reference numeral 55. The support member 55 has a generally annular body 56 having the form of a sheet having generally constant thickness, a plurality of perforations 57 and a central passageway 58. The body 55 has a generally frustoconical configuration and in effect behaves as a cone spring washer, and when installed in a joint end such as that depicted in FIG. 4 serves to maintain the liner under compression over extended periods of time.

Figure 7:
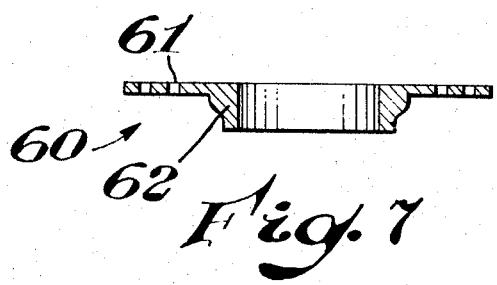

In FIG. 7 there is depicted an alternate support member generally designated by the reference numeral 60. The support member 60 has a generally annular radially extending flange portion 61 and an inwardly disposed axially extending flange 62 adapted to engage the inner surface of the conduit and maintain the flange in a fixed position.

The present invention may be employed with a wide variety of lined conduits such as steel or fiber reinforced polyester resin conduits lined with materials such as polytetrafluoroethylene, fluorinated ethylene-propylene copolymer, polyvinylidenefluoride, polychlorotrifluoroethylene, polybutyl acrylate, polyvinyl acetate, ethyl cellulose, polyformaldehyde, polyvinylfluoride, polyisobutyl methacrylate, polybutyl methacrylate, polymethyl acrylate, polypropyl methacrylate, polyethyl methacrylate, polymethyl methacrylate, cellulose acetate, cellulose propionate, cellulose acetate-butyrate, cellulose nitrate, polyvinyl butyral, polypropylene, low density polyethylene (branched), polyisobutylene, natural rubber, perbunan, polybutadiene, nylon (condensation copolymer of hexamethylene-diamine and adipic acid), polyvinyl chloroacetate, polyvinylchloride, high density linear polyethylene, a copolymer of 67 parts by weight methylmethacrylate and 33 parts by weight styrene, a copolymer of 85 parts by weight vinyl chloride and 15 parts by weight vinylidene chloride, poly-α-methylstyrene, a copolymer of 60 parts by weight styrene and 40 parts by weight butadiene, neoprene, a copolymer of 70 parts by weight styrene and 30 parts by weight acrylonitrile, polystyrene, rubber modified polystyrene, a copolymer of 85 parts by weight vinylidene chloride and 15 parts by weight vinyl chloride, polydichlorostyrene, polycarbonate resins such as 2,2-bis (chloromethyl) oxacyclobutane.

Multiple recessed support members suitable for practice of the present invention are those prepared from a material which does not exhibit substantial cold flow or deformation relative to the liner material; that is, the multiple recessed material should exhibit not more than 5 percent of the permanent deformation of the liner material under like service conditions. Some materials which are eminently satisfactory for the preparation of annular multiple recessed support members are metals such as steel, stainless steel, brass, copper, bronze, aluminum, ceramics such as porcelain and the like. Synthetic resinous thermosetting plastics such as rigid phenol-formaldehyde resins, polyester resins, epoxy resins, furfuryl alcohol resins and the like are generally satisfactory. A wide variety of multiple recessed support members may be employed for the practice of the present invention. The critical limitation is that the multiple recesses must be disposed in a surface which contacts the thermoplastic flange formed on the liner, and that the recesses are of sufficient size to receive material of the liner during the flange forming operation. Support members having a plurality of concentric grooves formed in one face are found useful. However, the grooves should occupy generally not more than 50 percent of the surface in order to protect peaks of the grooves from penetrating the liner material after prolonged service of the flanged conduit and cold flow of the plastic liner material. Such perforated metal sheet is eminently satisfactory for the preparation of support members and offers the economy that concentric rings may be punched and employed for various size pipe. Also useful is woven metal mesh which has been rolled and brazed. Generally, woven metal mesh which has not been rolled and brazed or welded exhibits some tendency to deform during molding operations under the influence of a viscous plastic.

A particularly convenient method of obtaining rigid multiple recessed support members is to prepare them from perforated sheet metal such as perforated sheet steel, as a wide variety of configurations are readily available from a punching operation. Further, the use of metals permits the punching of a plurality of concentric rings of perforated metal to provide support members for various sizes of pipe with a minimum of waste material. Woven wire mesh may also be employed with benefit. However, it is generally desirable that at least about 25 percent of the area of a face of the multiple recessed inert member provide rigid support. For example: if perforated sheet metal is employed, the openings in the sheet should not constitute more than about 75 percent of the area of the sheet, and beneficially not greater than about 50 percent of the sheet. Flanges on the synthetic resinous liner may be formed by any convenient molding means employing a sufficient temperature and pressure that the material of the liner forming the flange penetrates and fills the openings of the multiple recessed support.

Suitable flanging methods are set forth in U.S. Pat. Nos. 3,461,505; 3,448,491; 3,390,442; 3,383,750 and 3,335,484. The art of forming flanges by molding of the liner portion is well known in the art and the teaching of the foregoing U.S. patents is herewith incorporated by reference. Flanging of the liner to provide a flat face is very desirable. If the flanging operation does not provide a flat face, the exposed plastic face may be machined flat by milling, turning, grinding or the like.

In the preparation of flanged ends in accordance with the present invention, it is desirable that a layer of a polymer of a flange material overlie the multiple recessed insert by a thickness of from about 0.002 inch to about 0.125 inch, and beneficially from a thickness of about 0.02 inch to about 0.09 inch, and most advantageously a thickness of from about 0.05 inch to about 0.08 inch.

By way of further illustration, a plurality of 2 inch elbows are provided with flanges in accordance with the invention and compared with a similar elbow without the multiple recessed insert. In all tests a commercially available fluorinated ethylene-propylene polymer is employed as the lining material. In the first group of elbows, an insert generally as depicted in FIG. 1 is employed which has a thickness of 0.62 inch and ⅛-inch holes on 7/32-inch centers. Elbows in the second group employ a metallic insert having a thickness of 0.50 inch and 1/16-inch holes on ⅛-inch centers. Elbows in the third group employ an insert having a thickness of 0.62 inch and 5/32-inch holes on 7/32-inch centers. Elbows in the fourth group, for purposes of comparison, have no insert. In all cases, the distance from the flange on the elbows is about 0.115 inch. Joints between like elbows are evaluated by heating the elbows to 350° F., cooling to room temperature, pressure testing with water, re-heating to 350° F., cooling and pressure testing. Elbows in the first, second and third groups when assembled in accordance with FIG. 1 successfully withstand 120 temperature cycles without leaking. When joined in the manner of FIG. 1, with the exception that the cone spring washers are not employed, similar results are obtained. All flange bolts employed in the test are tightened with a torque of 25 foot pounds. Elbows in the fourth group after nine temperature cycles require re-tightening after each cycle and are disassembled. The liner adjacent the flange portions flows inwardly to reduce the internal diameter by about three-eighths inch. No substantial reduction in diameter of the liners of Groups 1, 2 and 3 is noted. The maximum pressure during cycling which could be retained by elbows in the fourth group is 100 pounds per square inch after nine cycles and 50 pounds per square inch after the first temperature cycle. Elbows in the first, second and third groups consistently show tight joints at pressures of 150 pounds per square inch.

In a similar manner, substantial improvement in conduit joints employing the hereinbefore delineated materials is obtained when employing multiple recessed inserts in accordance with the present invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A conduit, the conduit comprising
a rigid outer casing having
a first end, the first end having
a flange thereon adapted to connect with a mating flange, the conduit having
an inner synthetic polymeric lining, the lining being subject to cold flow, the lining having a flange adjacent the first end of the conduit, the lining flange extending generally parallel to the conduit flange and supported by said conduit flange, the improvement which comprises a multiple recessed rigid support disposed generally within the liner flange, the support defining a plurality of recesses, the recesses containing material of the liner flange and being in contact therewith.

2. The conduit of claim 1 wherein the multiple recessed rigid support is a perforate metallic element.

3. The conduit of claim 1 wherein the support has a generally annular configuration and means defining a shoulder adapted to engage the outer casing.

4. The conduit of claim 1 wherein the rigid support defines a generally axially and inwardly disposed flange.

5. A conduit in accordance with claim 1 in sealing engagement with a like conduit.

6. The conduit of claim 5 including means to axially tension the conduit section together.

7. The conduit of claim 1 wherein the support has a generally annular frustoconical configuration.

* * * * *